(12) United States Patent
Matta et al.

(10) Patent No.: US 11,986,977 B2
(45) Date of Patent: May 21, 2024

(54) METHOD AND REPROCESSING INSTALLATION FOR REPROCESSING FILM WASTE MATERIAL

(71) Applicant: Coperion GmbH, Stuttgart (DE)

(72) Inventors: Marina Matta, Gemmingen (DE); Jochen Schofer, Stuttgart (DE); Leonid Liber, Rutesheim (DE)

(73) Assignee: Coperion GmbH, Stuttgart (DE)

( * ) Notice: Subject to any disclaimer, the term of this patent is extended or adjusted under 35 U.S.C. 154(b) by 33 days.

(21) Appl. No.: 17/481,762

(22) Filed: Sep. 22, 2021

(65) Prior Publication Data

US 2022/0105662 A1     Apr. 7, 2022

(30) Foreign Application Priority Data

Sep. 25, 2020   (EP) ..................... 20198472

(51) Int. Cl.
| | |
|---|---|
| B29B 17/00 | (2006.01) |
| B29B 7/14 | (2006.01) |
| B29B 7/60 | (2006.01) |
| B29B 17/02 | (2006.01) |
| B29B 17/04 | (2006.01) |

(52) U.S. Cl.
CPC ............ B29B 17/0005 (2013.01); B29B 7/14 (2013.01); B29B 7/60 (2013.01); B29B 17/0026 (2013.01); B29B 17/02 (2013.01); B29B 17/04 (2013.01); B29B 2017/0224 (2013.01)

(58) Field of Classification Search
None
See application file for complete search history.

(56) References Cited

U.S. PATENT DOCUMENTS

2007/0161719 A1    7/2007  Rauh
2011/0266377 A1*  11/2011  Lindner ................... B03B 5/28
                                                         241/24.1

FOREIGN PATENT DOCUMENTS

| GB | 2333995 A | 8/1999 |
| JP | H07205147 A | 8/1995 |
| JP | 2001301009 A | 10/2001 |
| WO | 2019186311 A1 | 10/2019 |

OTHER PUBLICATIONS

EP 20 198 472.1 European Search Report dated Mar. 26, 2021.

* cited by examiner

*Primary Examiner* — Robert J Grun
(74) *Attorney, Agent, or Firm* — Dinsmore & Shohl LLP (57) ABSTRACT

In a method for reprocessing film waste material, the film waste material is comminuted into recycling material by means of a comminuting device. The recycling material is fed by means of a feeding device in a multi-shaft screw machine. In the multi-shaft screw machine, the recycling material is plasticized into a material melt and processed into raw material. The raw material may again be fed to a production installation for the production of films.

18 Claims, 6 Drawing Sheets

METHOD AND REPROCESSING INSTALLATION FOR REPROCESSING FILM WASTE MATERIAL

CROSS-REFERENCES TO RELATED APPLICATIONS

The present patent application claims the priority of European patent application, Serial No. EP 20 198 472.1, filed Sep. 25, 2020, the content of which is incorporated herein by reference in its entirety as if fully set forth herein.

FIELD OF THE INVENTION

The invention relates to a method and a reprocessing installation for reprocessing film waste material.

The production of films generates waste material that is not suitable for sale. This film waste material must be disposed of in a costly manner, which pollutes the environment and leads to disposal costs.

SUMMARY OF THE INVENTION

The invention is based on an object of creating a simple, cost-effective and environmentally friendly method for reprocessing film waste material. In particular, the film waste material is to be 100% recycled, so that a zerowaste production is made possible.

This object is achieved by a method for reprocessing film waste material, comprising the following steps:
Providing film waste material,
Comminuting the film waste material into recycling material by means of a comminuting device,
Feeding the recycling material into a multi-shaft screw machine by means of a feeding device,
Plasticizing the recycling material into a material melt by means of the multi-shaft screw machine, and
Processing of the material melt by means of the multi-shaft screw machine to raw material.

The film waste material is shredded into recycling material by means of a comminuting device. The film waste material is provided by the production of films. The produced films comprise at least one layer, preferably a plurality of layers. For example, the films are formed as composite films. In particular, the films comprise at least one polymer material, preferably a plurality of polymer materials. For example, the film waste material comprises polyamide (PA), polyethylene (PE) and/or ethylene vinyl alcohol copolymers (EVOH). The comminuting device is configured, for example, as a shredder. In particular, the comminuting device comprises at least one cutter, preferably a plurality of cutters. The at least one cutter or the plurality of cutters are in particular rotationally driven. Preferably, the plurality of cutters are rotationally driven in opposite directions.

The recycling material is subsequently fed into a multi-shaft screw machine by means of a feeding device. The multi-shaft screw machine is designed in particular as a co-rotating twin-shaft screw machine. The multi-shaft screw machine comprises a housing with a plurality of housing bores formed therein. Treatment element shafts are arranged in the housing bores. The treatment element shafts can be driven in rotation about associated axes of rotation. The treatment element shafts are designed in particular to be rotationally drivable in the same direction, i.e. in the same directions of rotation, and/or to mesh tightly. The treatment element shafts are driven in rotation by means of a drive motor via a branching gear. The multi-shaft screw machine has an outer screw diameter $D_{a2}$ and an inner screw diameter $D_{i2}$, wherein preferably $D_{a2}/D_{i2} \geq 1.5$, in particular $D_{a2}/D_{i2} \geq 1.55$, and in particular $D_{a2}/D_{i2} \geq 1.6$. In particular, $1.5 \leq D_{a2}/D_{i2} \leq 1.9$ applies.

The recycling material is plasticized into a material melt by means of the multi-shaft screw machine. Subsequently, the material melt is processed by means of the multi-shaft screw machine. The plasticizing and/or the processing may in particular comprise the steps of mixing, melting, homogenizing and/or degassing. At least one additive may be fed into the multi-shaft screw machine. Preferably, the at least one additive is mixed into the material melt during plasticizing and/or during processing. The at least one additive comprises in particular talc, filling materials, virgin material, stabilizers, for example antioxidants and/or UV stabilizers, colorants and/or masterbatches. The at least one additive is fed in particular by means of a metering device and/or a feed screw machine. The feed screw machine is designed, for example, as a side-feeding screw machine. The side-feeding screw machine is designed in particular with two shafts. Preferably, a screw outer diameter of the feed screw machine is at most equal to a screw outer diameter of the multi-shaft screw machine. The raw material resulting from the processing can be reused for the production of films. For example, the raw material is granulated and fed as granules and/or directly to a film production installation.

In particular, the method for reprocessing film waste material is part of a cycle or closed-loop method. The closed-loop method preferably comprises the steps of:
feeding raw material into a film production installation,
production of a film and associated provision of film waste material,
reprocessing of the film waste material according to the method of the invention, and
feeding the processed raw material into the film production installation.

Due to processing, up to 100%, in particular a proportion of 20% to 80%, and in particular a proportion of 40% to 60% of the processed raw material may be fed to the production of films. The proportion of the reprocessed raw material may be adjusted in the production of films. The proportion of polyethylene to polyamide can be controlled. The use of expensive polyamide can be reduced. The reprocessed raw material (recyclate) can be used flexibly, since the quality of the reprocessed raw material is high and the reprocessed raw material may be used in many products.

A method configured such that the comminution takes place at a temperature T, wherein: $T \leq 100°$ C., in particular $T \leq 90°$ C., in particular $T \leq 80°$ C., and in particular $T \leq 70°$ C., ensures simple, cost-effective and environmentally friendly reprocessing. Due to the fact that the comminution takes place at most at the temperature T, a melting and/or a degradation of the film waste material is avoided. The temperature T is in particular below a melting temperature and/or a degradation temperature of the film waste material. Preferably, the film waste material is cooled prior to comminution and/or during comminution. Preferably, the film waste material is cooled in the comminuting device. The comminuting device has, for example, cooled rollers or shafts with cutters arranged thereon.

A method configured such that the recycling material has a bulk density p, wherein: 10 g/dm³$\leq \rho \leq$300 g/dm³, in particular 15 g/dm³$\leq \rho \leq$250 g/dm³, and in particular 20 g/dm³$\leq \rho \leq$200 g/dm³, ensures simple, cost-effective and environmentally friendly reprocessing. The bulk density p enables easy further processing of the recycling material. The recycling material is formed in particular as flakes, shreds and/or pellets.

A method configured such that the recycling material is screened by means of a screen, wherein the screen in particular has a screen size S and wherein: 1 mm≤S≤50 mm, in particular 5 mm≤S≤35 mm, and in particular 10 mm≤S≤20 mm, ensures simple, cost-effective and environmentally friendly reprocessing. The screen size S ensures easy further processing of the recycling material. The screen size S characterizes the mesh size of the screen. In particular, the screen is integrated into the comminuting device. The comminuting device preferably comprises a recirculation system for re-comminuting of recycling material which has not passed the screen.

A method configured such that the feeding device comprises a conveying device, ensures simple, cost-effective and environmentally friendly reprocessing. The conveying device conveys the recycling material from the comminuting device to the multi-shaft screw machine. The conveying device is preferably configured as to be pneumatic. In particular, the conveying device comprises a conveying line and/or an air flow generating device, for example a blower. Preferably, the conveying device serves to convey the recycling material from the comminuting device to a metering device.

For this purpose, in particular, a conveying line runs from the comminuting device to the metering device.

A method configured such that the feeding device comprises a metering device, ensures simple, cost-effective and environmentally friendly reprocessing. The metering device enables precise metering of the recycling material for subsequent feeding into the multi-shaft screw machine. The metering device is designed as to be gravimetric or volumetric. The gravimetric metering device comprises in particular a weighing machine, preferably a belt weigher. The gravimetric metering device is particularly suitable for weighing the fluffy or airy recycling material. The metering device in particular opens into a feed screw machine.

A method configured such that the feeding device comprises a feed screw machine, ensures simple, cost-effective and environmentally friendly reprocessing. The feed screw machine enables the recycling material to be fed into the multi-shaft screw machine in a simple manner. In particular, the feed screw machine is configured as a side-feeding screw machine. The side-feeding screw machine is connected with the multi-shaft screw machine and opens laterally into the multi-shaft screw machine.

The feed screw machine comprises a housing in which at least two housing bores are formed. A screw shaft is arranged in each of the housing bores so that it can be driven in rotation about an axis of rotation. The screw shafts can be driven in rotation in particular in the same direction. The screw shafts are driven by a drive motor and a branching gear. The screw shafts may be conical when viewed in an axial section. Furthermore, the screw shafts may have a box profile and/or a thrust edge profile when viewed in cross-section. In particular, the feed screw machine is of two-shaft design.

A method configured such that the feed screw machine has a free cross-sectional area $A_1$ and the multi-shaft screw machine has a free cross-sectional area $A_2$, wherein $A_1 > A_2$, in particular $1.3 \leq A_1/A_2 \leq 5$, in particular $1.5 \leq A_1/A_2 \leq 4$, in particular $1.7 \leq A_1/A_2 \leq 3.5$, and in particular $1.8 \leq A_1/A_2 \leq 3$, ensures simple, cost-effective and environmentally friendly reprocessing. Due to the fact that the free cross-sectional area $A_i$ of the feed screw machine is larger than the free cross-sectional area $A_2$ of the multi-shaft screw machine, the recycling material can be fed to the multi-shaft screw machine in a simple manner. The free cross-sectional area is generally defined as the free area between the housing or a housing inner wall and the treatment element shafts or the screw shafts.

A method configured such that the feed screw machine has a screw outer diameter $D_{a1}$ and the multi-shaft screw machine has a screw outer diameter $D_{a2}$, wherein $D_{a1} \geq D_{a2}$, in particular $1.05 \leq D_{a1}/D_{a2} \leq 1.9$, in particular $1.1 \leq D_{a1}/D_{a2} \leq 1.7$, and in particular $1.15 \geq D_{a1}/D_{a2} \geq 1.5$, ensures simple, cost-effective and environmentally friendly reprocessing. Due to the fact that the screw outer diameter $D_{a1}$ of the feed screw machine is at least as large as the screw outer diameter $D_{a2}$ of the multi-shaft screw machine, a simple feeding of the recycling material into the multi-shaft screw machine is enabled. The larger $D_{a1}/D_{a2}$, the larger in particular a ratio of a free cross-sectional area $A_1$ of the feed screw machine to a free cross-sectional area $A_2$ of the multi-shaft screw machine.

A method configured such that the feed screw machine has a screw outer diameter $D_{a1}$ and a screw inner diameter $D_{i1}$, wherein $D_{a1}/D_{i1} \geq 1.7$, in particular $D_{a1}/D_{i1} \geq 1.8$, and in particular $D_{a1}/D_{i1} \geq 1.9$, ensures simple, cost-effective and environmentally friendly reprocessing. The larger $D_{a1}/D_{i1}$, the larger a free cross-sectional area $A_1$ of the feed screw machine. A larger $D_{a1}/D_{i1}$ simplifies the feeding of the recycling material. In particular, the following applies: $2.0 \leq D_{a1}/D_{i1} \leq 2.9$.

A method configured such that the feeding device comprises a suction device for compacting the recycling material, ensures simple, cost-effective and environmentally friendly reprocessing. Due to the suction device, the airy recycling material is compacted. The suction device is in particular connected to a feed screw machine. The suction device comprises in particular a vacuum pump and at least one filter. The at least one filter is arranged between the housing bores of the feed screw machine and the vacuum pump, such that air is sucked out of the recycling material and the compacted recycling material remains in the feed screw machine or the housing bores. Preferably, the at least one filter is designed as a filter insert and is arranged in the housing of the feed screw machine.

A method comprising a degassing of the material melt in the multi-shaft screw machine ensures simple, cost-effective and environmentally friendly reprocessing. The degassing takes place during plasticizing and/or during processing and/or discharging. In particular, the degassing takes place after plasticizing during homogenizing and/or compounding and/or processing and/or discharging. For degassing, preferably, an entraining agent is used, for example water. The degassing is carried out by means of a degassing device, in particular a vacuum degassing device. The degassing takes place at an absolute pressure p, wherein:
1 mbar≤p≤100 mbar, in particular 1 mbar≤p≤20 mbar. The degassing device preferably comprises a vacuum pump and/or a separator. The separator is in particular cooled. The separator preferably serves to separate ethylene-vinyl alcohol copolymers and/or to separate water.

A method configured such that the recycling material has an average residence time $t_V$ in the multi-shaft screw machine, wherein 15 s≤$t_V$≤90 s, in particular 20 s≤$t_V$≤70 s, and in particular 25 s≤$t_V$≤50 s, ensures simple, cost-effective and environmentally friendly reprocessing. Due to the short average residence time $t_V$ of the recycling material or the material melt or the processed raw material in the multi-shaft screw machine, degradation of the recycling material or the material melt or the raw material is avoided, such that the raw material enables the production of films with highest quality standards. The average residence time can be determined, for example, by means of color indicators.

A method comprising a filtering of the raw material by means of a filtering device, ensures simple, cost-effective and environmentally friendly reprocessing. The filtering ensures a high quality and/or homogeneity of the raw material. Preferably, the filtering is performed by means of at least one melt filter. Preferably, the filtering device is designed as a screen changer with at least two melt filters.

The invention is further based on an object of creating a reprocessing installation for simple, cost-effective and environmentally friendly reprocessing of film waste material.

This object is achieved by a reprocessing installation for reprocessing film waste material with a comminuting device for comminuting the film waste material into recycling material,
a feeding device for feeding the recycling material, and
a multi-shaft screw machine for plasticizing the recycling material into a material melt and for processing the material melt into raw material ($R_W$).

The advantages of the reprocessing installation according to the invention correspond to the advantages of the method according to the invention already described. The reprocessing installation may in particular also be further developed with at least one of the various features described herein and the method according to the invention.

The reprocessing installation is preferably part of a closed-loop production installation. The closed-loop production installation comprises a film production installation and the reprocessing installation according to the invention. Film waste material generated in the film production installation is fed to the reprocessing installation. The raw material produced in the reprocessing installation is fed to the film production installation, if necessary, with further raw material (virgin material).

Further features, advantages and details of the invention will be apparent from the following description of an embodiment.

DESCRIPTION OF THE PREFERRED EMBODIMENT

Figure 1:
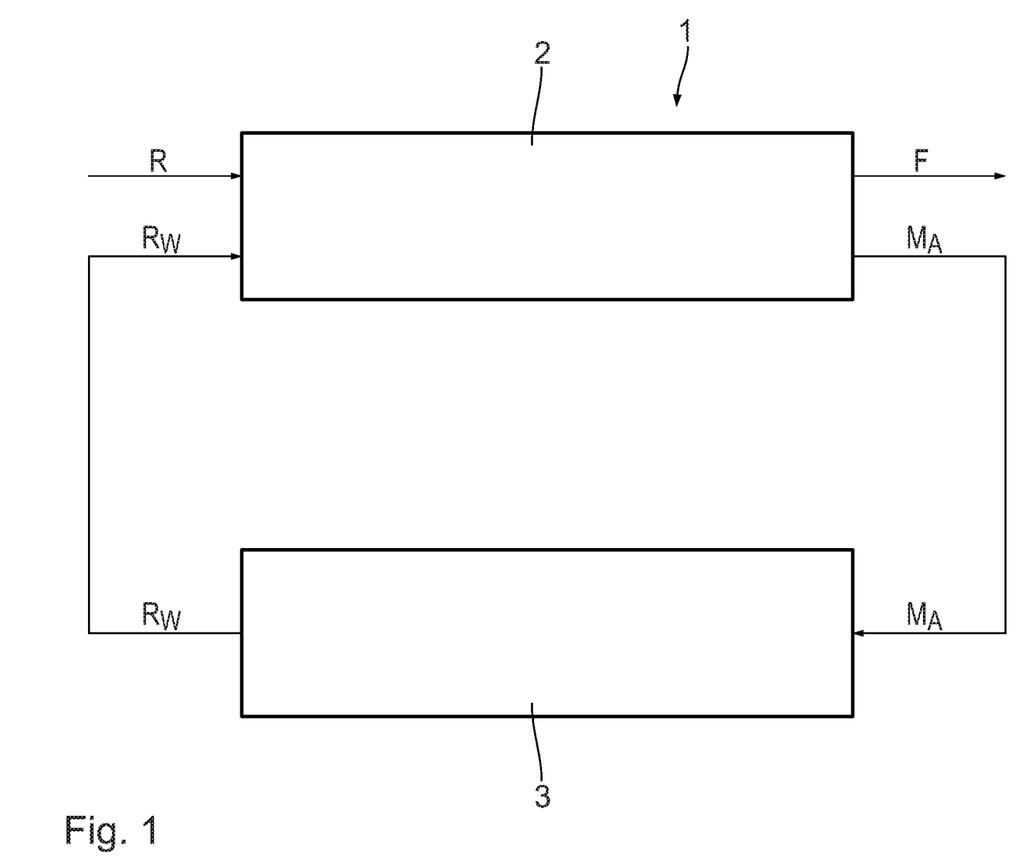
FIG. 1 shows a schematic view of a closed-loop production installation with a film production installation and a reprocessing installation for reprocessing film waste material.

A closed-loop production installation 1 comprises a film production installation 2 and a reprocessing installation 3.

The film production installation 2 is used to produce films F from non-reprocessed raw material R (virgin material) and from processed raw material $R_W$. The film production installation 2 is designed in the usual way. Film waste material $M_A$ arising during the production of films F is fed to the reprocessing installation 3. The reprocessing installation 3 serves to reprocess the film waste material $M_A$ into raw material $R_W$. The raw material $R_W$ is fed proportionally to the film production installation 2, together with the raw material R.

Figure 2:
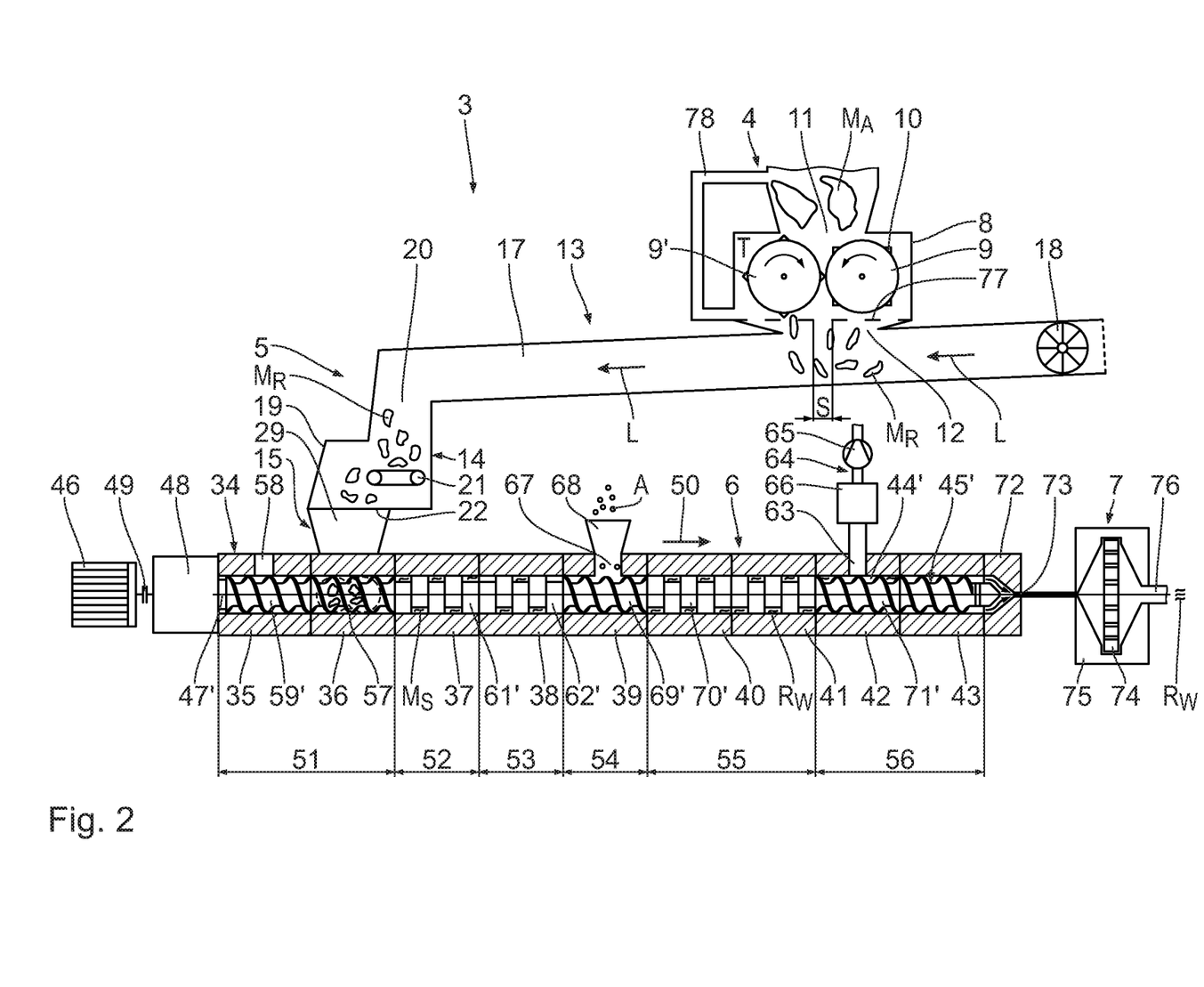
FIG. 2 shows a schematic and partially sectioned view of the reprocessing installation with a comminuting device, a feeding device, a multi-shaft screw machine and a filtering device.

The reprocessing installation 3 includes a comminuting device 4, a feeding device 5, a multi-shaft screw machine 6 and a filtering device 7.

The comminuting device 4 serves for comminuting the film waste material $M_A$ into recycling material $M_R$. The comminuting device 4 comprises a housing 8 in which two rollers 9, 9' with cutters 10 arranged thereon are mounted rotatably about axes of rotation. The rollers 9, 9' are driven in rotation in opposite directions of rotation by means of drive motors, not shown in greater detail. A feed opening 11 is formed in the housing 8 for feeding the film waste material $M_A$. The feed opening 11 may be connected with the film production installation 2 for supplying film waste material $M_A$. A discharge opening 12 is further formed in the housing 8, through which the recycling material $M_R$ is fed to the feeding device 5. The comminuting device 4 is configured, for example, as a shredder.

The comminuting device 4 comprises a screen 77. The screen 77 is integrated in the housing 8. The screen 77 is arranged between the rollers 9, 9' and the discharge opening 12. The screen has a screen size S, wherein 1 mm≤S≤50 mm, in particular 5 mm≤S≤35 mm, and in particular 10 mm≤S≤20 mm. In order to generate vibrations, the screen 77 is coupled to a vibration mechanism not shown in more detail. For returning recycling material $M_R$ which has not passed the screen 77, the comminuting device 4 comprises a recirculation system 78. By means of the recirculation system 78, recycling material $M_R$ which has not passed the screen 77 and remains on the screen 77 is transported back in front of the rollers 9, 9', such that this recycling material $M_R$ is re-comminuted. The recirculation is carried out pneumatically, for example.

The feeding device 5 comprises a pneumatic conveying device 13, a gravimetric metering device 14, a feed screw machine 15 and a suction device 16.

The pneumatic conveying device 13 comprises a conveying line 17 into which the discharge opening 12 opens. The conveying line 17 is connected to an air flow generating device 18. The air flow generating device 18 is, for example, a blower. The air flow generating device 18 generates an air flow L in the conveying line 17 for pneumatically conveying the recycling material $M_R$ from the comminuting device 4 to the gravimetric metering device 14.

The gravimetric metering device 14 comprises a housing 19 in which a feed opening 20 is formed. The conveying line 17 opens into the feed opening 20. A belt weigher 21 is arranged in the housing 19. The belt weigher 21 serves for weighing and metered feeding of the recycling material $M_R$ to the feed screw machine 15. For this purpose, a discharge opening 22 is formed in the housing 19.

Figure 3:
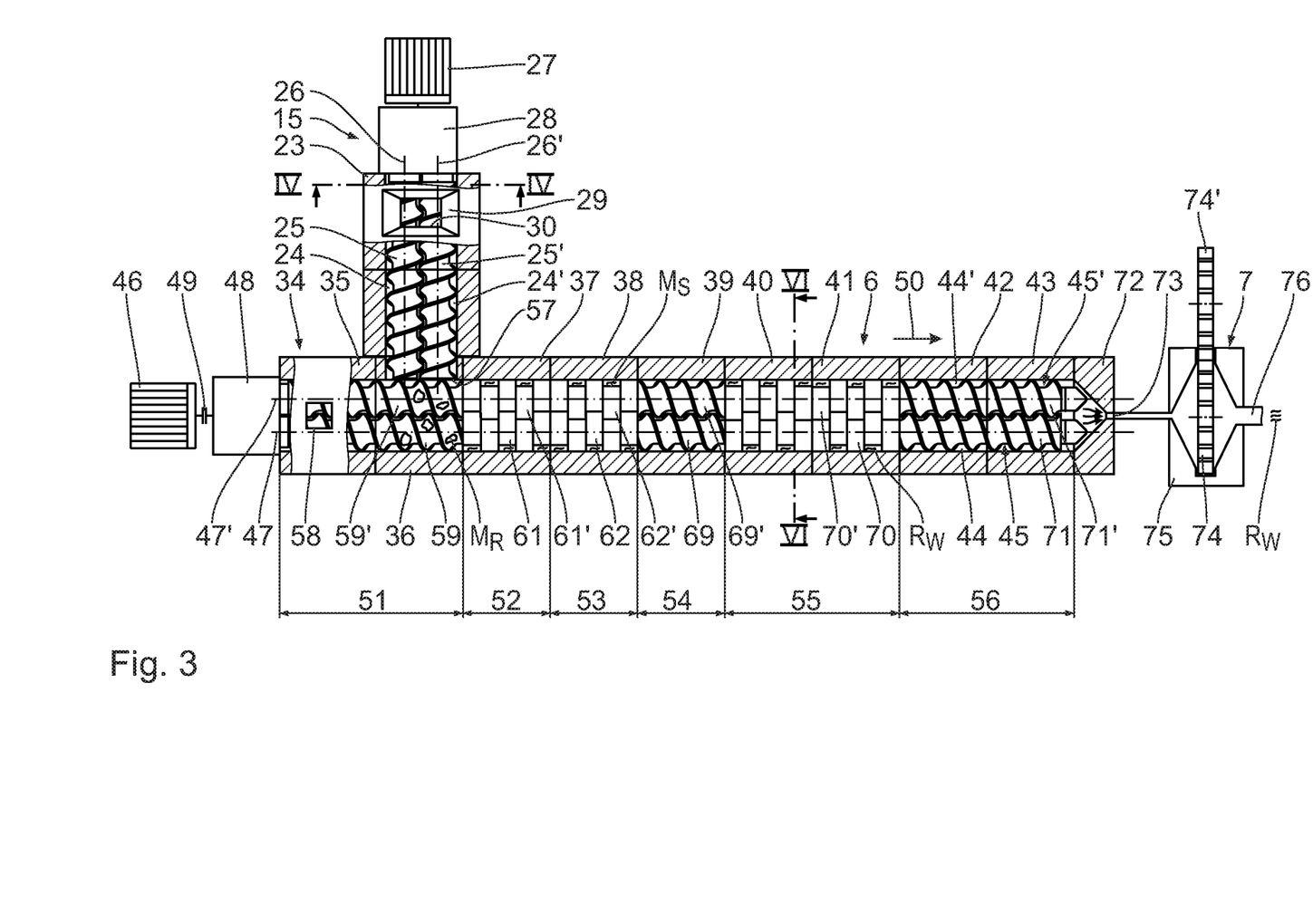
FIG. 3 shows a schematic and partially sectioned top view of the reprocessing installation with a feed screw machine of the feeding device, the multi-shaft screw machine and the filtering device.

The feed screw machine 15 is designed as a side-feeding screw machine. The feed screw machine 15 comprises a housing 23 in which two interpenetrating housing bores 24, 24' are formed. In cross-section, the housing bores 24, 24' have the shape of a horizontal figure eight. In the housing bores 24, 24', associated screw shafts 25, 25' are arranged rotatably about axes of rotation 26, 26'. For driving the screw shafts 25, 25' in rotation, the feed screw machine 15 comprises a drive motor 27 and a branching gear 28. For feeding the recycling material $M_R$, the feed screw machine 15 comprises a hopper 29 which opens into a feed opening 30 formed in the housing 23. The screw shafts 25, 25' are rotationally driven in the same directions of rotation by means of the drive motor 27 and the branching gear 28.

Figure 4:
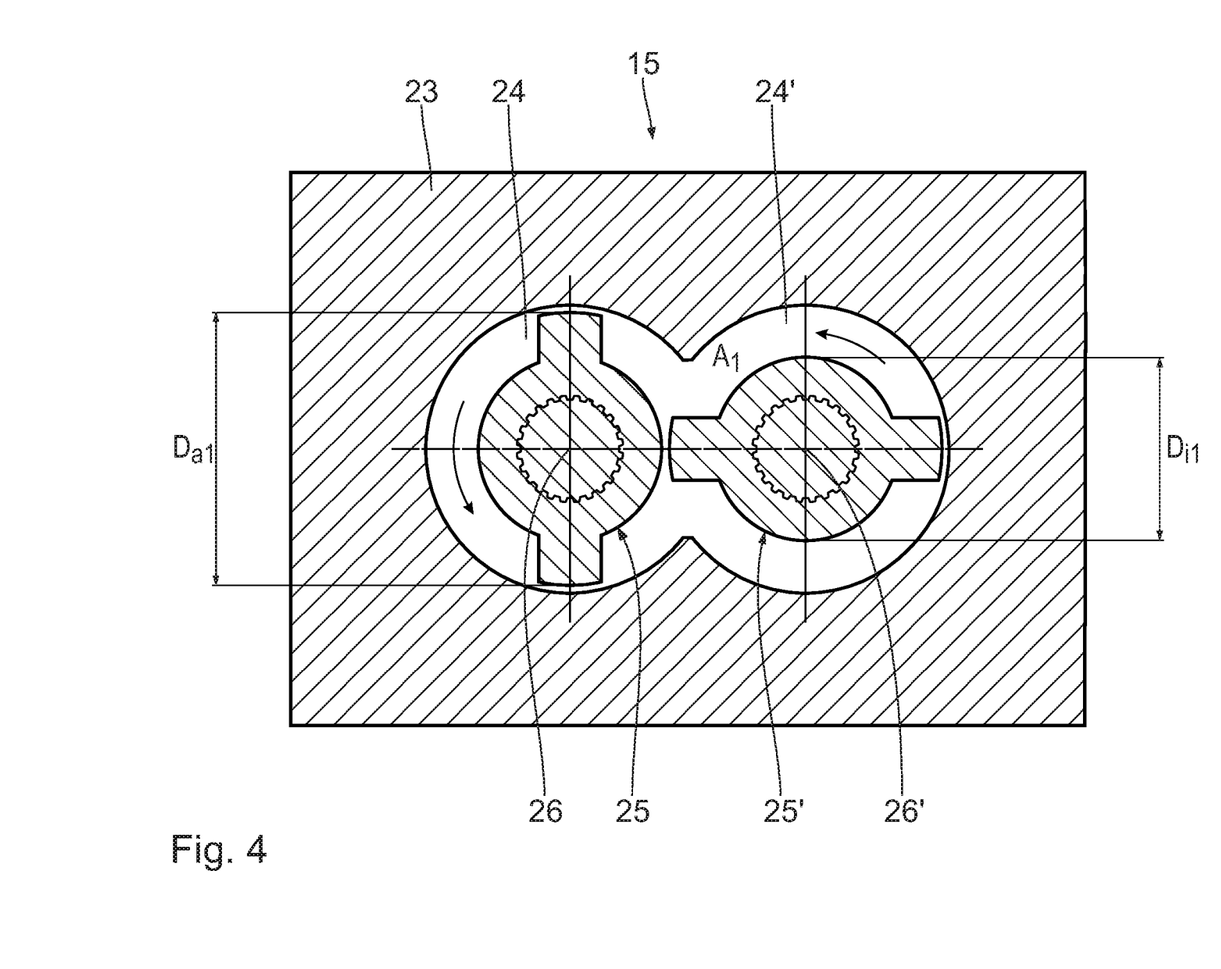
FIG. 4 shows a section through the feed screw machine along the section line IV-IV in FIG. 3.

The screw shafts 25, 25' have a screw outer diameter $D_{a1}$ and a screw inner diameter $D_{i1}$, wherein $D_{a1}/D_{i1} \geq 1.7$, in particular $D_{a1}/D_{i1} \geq 1.8$, and in particular $D_{a1}/D_{i1} \geq 1.9$. The screw shafts 25, 25' have a box profile when viewed in cross section. The box profile is illustrated in FIG. 4. The box profile increases a free cross-sectional area $A_1$ of the feed screw machine 15. The free cross-sectional area $A_1$ is the cross-sectional area between the housing 23 and the screw shafts 25, 25'. The free cross-sectional area $A_1$ is illustrated in FIG. 4.

Figure 5:
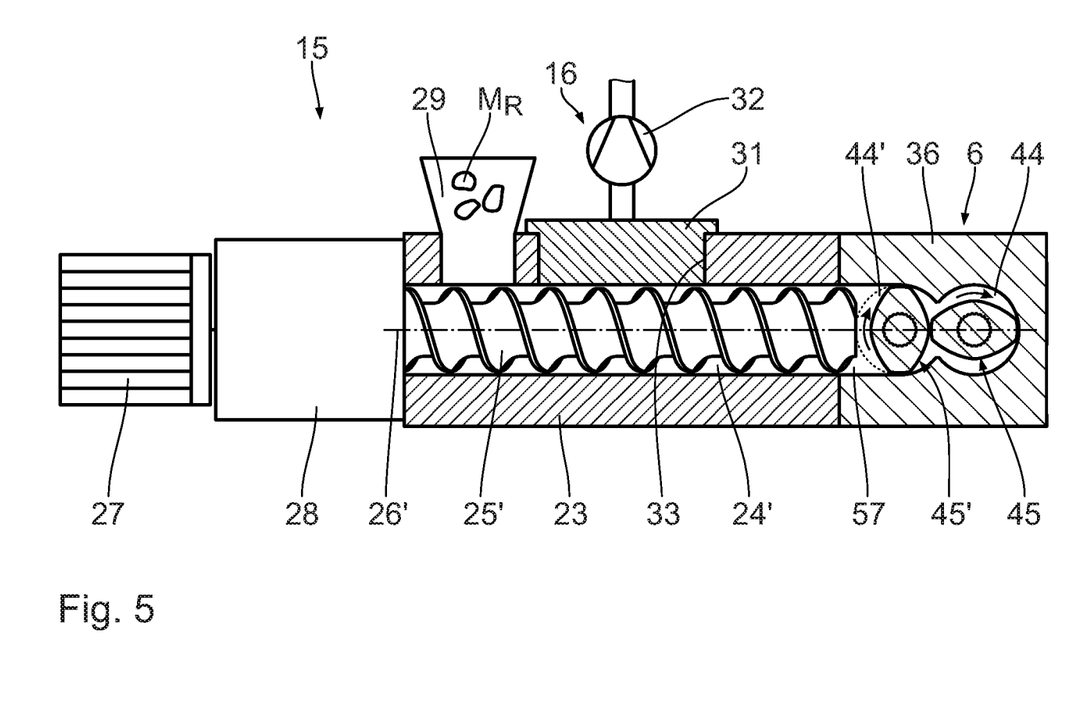
FIG. 5 shows a partially sectioned side view of the feed screw machine illustrating a suction device.

The suction device 16 serves for compacting the recycling material $M_R$. The suction device 16 comprises a filter insert 31 and a vacuum pump 32. The vacuum pump 32 is connected to the filter insert 31. The filter insert 31 comprises a frame-shaped base body and at least one filter element arranged therein. The filter insert 31 is formed, for example, according to DE 10 2013 208 993 A1. The filter insert 31 is arranged in a through opening 33 of the housing 23. The vacuum pump 32 is in flow communication with the housing bores 24, 24' via the filter insert 31. As a result, it is possible to extract air from the housing bores 24, 24' or to vent the housing bores 24, 24'.

The multi-shaft screw machine 6 serves for plasticizing the recycling material $M_R$ into a material melt $M_S$ and for processing the material melt $M_S$ into the raw material $R_W$. The multi-shaft screw machine 6 is designed as a co-rotating twin-shaft screw machine. The multi-shaft screw machine 6 comprises a housing 34 formed of a plurality of housing portions 35 to 43 arranged in succession The housing sections 35 to 43 are connected with each other to form the housing 34. Two housing bores 44, 44' are formed in the housing 34 parallel to each other and penetrating each other, which have the shape of a horizontal figure eight in cross-section. Concentrically arranged in the housing bores 44, 44' are two treatment element shafts 45, 45' which can be driven in rotation by a drive motor 46 about associated axes of rotation 47, 47'. A branching gear 48 and a coupling 49 are arranged between the treatment element shafts 45, 45' and the drive motor 46. The treatment element shafts 45, 45' are driven in the same direction, i.e. in the same directions of rotation about the axes of rotation 47, 47', by means of the drive motor 46.

The multi-shaft screw machine 6 has, in sequence in a conveying direction 50, a draw-in zone 51, a plasticizing zone 52, a homogenizing zone 53, a feed zone 54, a mixing zone 55, and a discharge zone 56.

In the draw-in zone 51, the housing portion 36 has a feed opening 57 at the side. The feed opening 57 has the shape of a horizontal figure eight in cross-section. The feed screw machine 15 is connected laterally to the housing 34 such that the screw shafts 25, 25' open into the feed opening 57. A vent opening 58 is formed in the housing section 35 for easier feeding of the recycling material $M_R$. In the draw-in zone 51, the treatment element shafts 45, 45' comprise screw elements 59, 59' which are arranged in a rotationally fixed manner on associated shafts 60, 60' and serve to convey the recycling material $M_R$.

In the plasticizing zone 52, the recycling material $M_R$ is melted. For melting, kneading elements 61, 61' are arranged in a rotationally fixed manner on the shafts 60, 60' in the plasticizing zone 52. The kneading elements 61, 61' are designed as kneading disks. Preferably, kneading blocks are arranged on the shafts 60, 60' in the plasticizing zone 52, which comprise a plurality of kneading disks formed in one piece with each other. In the plasticizing zone 52, the recycling material is melted to form the material melt $M_S$.

In the homogenizing zone 53, the material melt $M_S$ is homogenized and degassed. In the homogenizing zone 53, kneading elements 62, 62' are arranged on the shafts 60, 60' in a rotationally fixed manner. The kneading elements 62, 62' are designed in particular as kneading disks. Preferably, kneading blocks are arranged in the homogenizing zone 53, which are formed from a plurality of kneading disks connected with each other in one piece.

Additives A are fed in the feed zone 54. For this purpose, a feed opening 67 is formed in the housing portion 39, into which a feed hopper 68 opens. The additives A are fed, for example, into the feed hopper 68 via a gravimetric metering device, not shown in greater detail, and/or into the multi-shaft screw machine 6 via a feed screw machine, not shown in greater detail. In the feed zone 54, screw elements 69, 69' are arranged in a rotationally fixed manner on the shafts 60, 60'.

In the mixing zone 55, the additives A are melted and mixed into the material melt $M_S$ and the mixture is homogenized to the raw material $R_W$. In the mixing zone 55, kneading elements 70, 70' are arranged on the shafts 60, 60' in a rotationally fixed manner. The kneading elements 70, 70' are preferably designed as kneading disks. In the mixing zone 55, for example, kneading blocks are arranged which are formed from kneading disks connected with each other in one piece.

In the discharge zone 56, screw elements 71, 71' are arranged on the shafts 60, 60' in a rotatably fixed manner to discharge the raw material $R_W$. A degassing opening 63 is formed in the housing portion 42. The degassing opening 63 is connected to a vacuum degassing device 64, so that the raw material $R_W$ is degassed via the degassing opening 63 by means of the vacuum degassing device 64. The vacuum degassing device 64 comprises a vacuum pump 65 connected to the degassing opening 63 via a separator 66. The separator 66 is cooled by means of a cooling system. A nozzle plate 72, closing the housing 34, which forms a discharge opening 73, is arranged at the last housing portion 43.

Figure 6:
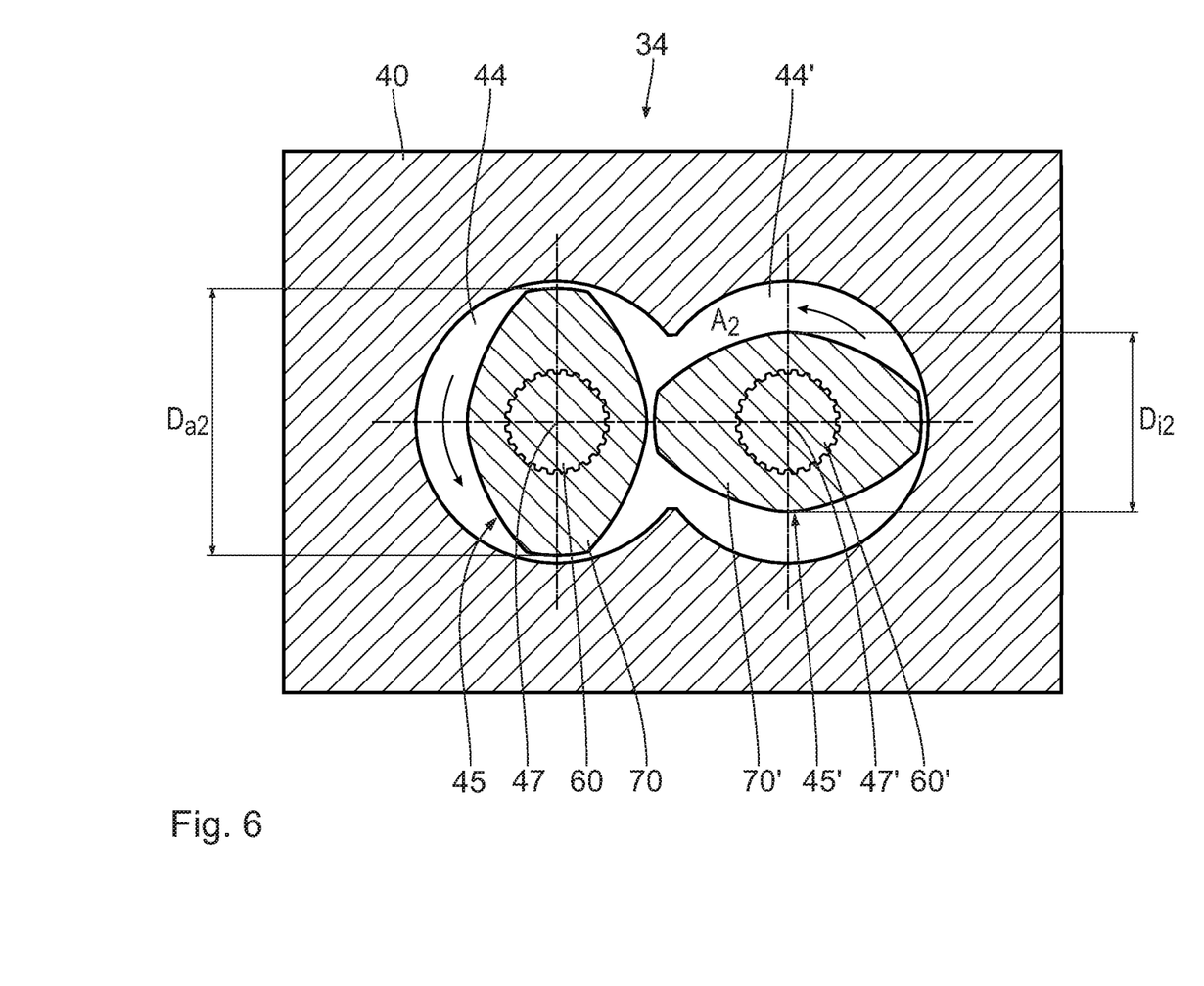
FIG. 6 shows a section through the multi-shaft screw machine along the section line VI-VI in FIG. 3.

The treatment element shafts 45, 45' of the multi-shaft screw machine 6 have a screw outer diameter $D_{a2}$ and a screw inner diameter $D_{i2}$. The multi-shaft screw machine 6 has a free cross-sectional area $A_2$. The free cross-sectional area $A_2$ is the free area between the housing 34 and the treatment element shafts 45, 45'. The free cross-sectional area $A_2$ is illustrated in FIG. 6.

For the free cross-sectional areas $A_1$ and $A_2$, $A_1 > A_2$, in particular $1.3 \leq A_1/A_2 \leq 5$, in particular $1.5 \leq A_1/A_2 \leq 4$, in particular $1.7 \leq A_1/A_2 \leq 3.5$, and in particular $1.8 \leq A_1/A_2 \leq 3$.

For the screw outer diameters $D_{a1}$ and $D_{a2}$, $D_{a1} \geq D_{a2}$, in particular $1.05 \leq D_{a1}/D_{a2} \leq 1.9$, in particular $1.1 \leq D_{a1}/D_{a2} \leq 1.7$, and in particular $1.15 \leq D_{a1}/D_{a2} \leq 1.5$.

The filtering device 7 is connected to the multi-shaft screw machine 6 and connected with the discharge opening 73. The filtering device 7 is designed as a screen changer. The filtering device 7 comprises two melt filters 74, 74', which are displaceably arranged in a housing 75. The filtered raw material $R_W$ is fed to the film production installation 2 via a discharge line 76.

In the following, the reprocessing of the film waste material $M_A$ is described:

During the production of films F by means of the film production installation 2, the film waste material $M_A$ arises. The film waste material $M_A$ is comminuted by the comminuting device 4 to form the recycling material $M_R$. The cutters 10 of the counter-rotationally driven rollers 9, 9' cut up the film waste material $M_A$. The recycling material $M_R$ is present as shreds, flakes and/or pellets. The recycling material $M_R$ has a bulk density $\rho$, wherein: 10 g/dm$^3 \leq \rho \leq$ 300 g/dm$^3$, in particular 15 g/dm$^3 \leq \rho \leq$ 250 g/dm$^3$, and in particular 20 g/dm$^3 \leq \rho \leq$ 200 g/dm$^3$.

The comminution takes place at a temperature T, wherein T≤100° C., in particular T≤90° C., in particular T≤80° C., and in particular T≤70° C. If necessary, the comminuting device 4 or the film waste material $M_A$ is cooled. The temperature T prevents degradation of the film waste material $M_A$. The temperature T is below a melting temperature or a degradation temperature of the film waste material $M_A$.

After comminution, the recycling material $M_R$ is screened by means of the screen 77. The recycling material $M_R$ remaining on the screen 77 is transported back in front of the rollers 9, 9' by means of the recirculation system 78 and re-comminuted.

The recycling material $M_R$ is subsequently conveyed by means of the pneumatic conveying device 13 from the comminuting device 4 to the gravimetric metering device 14. In the gravimetric metering device 14, the recycling material $M_R$ is weighed by means of the belt weigher 21 and fed in a desired dosage to the feed screw machine 15 via the hopper 29.

By means of the suction device 16, the recycling material $M_R$ is compressed or compacted in the housing bores 24, 24'. For this purpose, air is removed from the housing bores 24, 24' via the filter insert 31 by means of the vacuum pump 32. By means of the screw shafts 25, 25', the compacted recycling material $M_R$ is fed through the feed opening 57 into the housing bores 44, 44' of the multi-shaft screw machine 6. Due to the box profile of the screw shafts 25, 25', the feed screw machine 15 has a comparatively large free cross-sectional area $A_1$. As a result, the compacted recycling material $M_R$ may be fed to the multi-shaft screw machine 6 with a comparatively large throughput.

The compacted recycling material $M_R$ enters the housing bores 44, 44' of the multi-shaft screw machine 6 in the draw-in zone 51. Additives A can be fed in the draw-in zone 51. The recycling material $M_R$ is conveyed in the conveying direction 50 to the plasticizing zone 52. Air escaping from the recycling material $M_R$ may be discharged through the vent opening 58.

In the plasticizing zone 52, the recycling material $M_R$ is melted by means of the kneading elements 61, 61' and the material melt $M_S$ is homogenized in the subsequent homogenizing zone 53.

In the feed zone 54, additives A are fed to the material melt $M_S$ via the feed opening 67. Additives A are, for example, talc, filler materials, virgin material, stabilizers, colorants and/or masterbatches. Raw material R (virgin material) may thus be fed as an additive A.

In mixing zone 55, the additives A are melted and mixed into the material melt $M_S$ and the mixture is homogenized.

Gases escaping from the material melt $M_S$ or the resulting raw material $R_W$ are discharged by means of the vacuum degassing device 64. The degassing takes place at an absolute pressure p of 1 mbar to 100 mbar. The discharged gases pass through the separator 66. The separator 66 is cooled. Ethylene-vinyl alcohol copolymers (EVOH) and/or water are separated in the separator 66. An entraining agent may be fed to the housing bores 44, 44' for more efficient degassing. For example, water may be supplied as the entraining agent. If necessary, the material melt $M_S$ may be degassed before the additives A are fed. The degassing may be carried out by means of a vacuum degassing device corresponding to the vacuum degassing device 64.

The resulting raw material $R_W$ is then discharged from the multi-shaft screw machine 6 via the discharge zone 56 through the discharge opening 73.

The recycling material $M_R$ or the material melt $M_S$ or the raw material $R_W$ has an average residence time $t_V$ in the multi-shaft screw machine 6 from the feed opening 57 to the discharge opening 73. The following applies to the average residence time $t_V$: 15 s $\leq t_V \leq$ 90 s, in particular 20 s $\leq t_V \leq$ 70 s, and in particular 25 s $\leq t_V \leq$ 50 s. The discharged raw material $R_W$ is subsequently filtered by means of the filtering device 7. For this purpose, the raw material $R_W$ must pass through the melt filter 74. By passing through the melt filter 74, the homogenization of the raw material $R_W$ is improved.

The filtered raw material $R_W$ is either granulated and fed as granules or directly to the film production installation 2. In addition, raw material R that has not been reprocessed is fed to the film production installation 2.

The film production installation 2 and the reprocessing installation 3 are thus operated in a closed loop as a closed loop production installation 1. By means of the reprocessing installation 3, preferably at least 60%, in particular at least 80%, in particular at least 99% of the film waste material $M_A$ is reprocessed. This essentially ensures a zerowaste production of films F.

In general, the following applies:

The closed-loop production installation 1 and/or the film production installation 2 and/or the reprocessing installation 3 comprises a control device for controlling the production of films F and/or for reprocessing the film waste material $M_A$. The control device is designed in such a way that the method according to the invention for reprocessing film waste material $M_A$ can be carried out by means of the control device.

What is claimed is:

1. A method for reprocessing film waste material, comprising the following steps:
   providing film waste material,
   comminuting the film waste material into recycling material by means of a comminuting device,
   feeding the recycling material into a multi-shaft screw machine by means of a feeding device,
   plasticizing the recycling material into a material melt by means of the multi-shaft screw machine, and
   processing of the material melt by means of the multi-shaft screw machine to raw material,
   wherein the feeding device comprises a feed screw machine, the feed screw machine has a free cross-sectional area $A_1$ and the multi-shaft screw machine has a free cross-sectional area $A_2$, and wherein $A_1 > A_2$.

2. The method according to claim 1, wherein the comminution takes place at a temperature T, wherein:
   T≤100° C.

3. The method according to claim 1, wherein the recycling material has a bulk density $\rho$, wherein:
   10 g/dm$^3 \leq \rho \leq$ 300 g/dm$^3$.

4. The method according to claim 1, wherein the recycling material is screened by means of a screen.

5. The method according to claim 4, wherein the screen has a screen size S and wherein: 1 mm ≤ S ≤ 50 mm.

6. The method according to claim 1, wherein the feeding device comprises a conveying device.

7. The method according to claim 1, wherein the feeding device comprises a metering device.

8. The method according to claim 1, wherein $1.3 \leq A_1/A_2 \leq 5$.

9. The method according to claim 1, wherein $1.5 \leq A_1/A_2 \leq 4$.

10. The method according to claim 1, wherein wherein $1.7 \leq A_1/A_2 \leq 3.5$.

11. The method according to claim 1, wherein $1.8 \leq A_1/A_2 \leq 3$.

12. The method according to claim 1, wherein the feed screw machine has a screw outer diameter $D_{a1}$ and the multi-shaft screw machine has a screw outer diameter $D_{a2}$, wherein $D_{a1} \geq D_{a2}$.

13. The method according to claim 1, wherein the feed screw machine has a screw outer diameter $D_{a1}$ and a screw inner diameter $D_{i1}$ wherein $D_{a1}/D_{i1} \geq 1.7$.

14. The method according to claim 1, wherein the feeding device comprises a suction device for compacting the recycling material.

15. The method according to claim 1, comprising a degassing of the material melt in the multi-shaft screw machine.

16. The method according to claim 1, wherein the recycling material has an average residence time $t_V$ in the multi-shaft screw machine, wherein $15 \text{ s} \leq t_V \leq 90 \text{ s}$.

17. The method according to claim 1, comprising a filtering of the raw material by means of a filtering device.

18. A reprocessing installation for reprocessing film waste material with
- a comminuting device for comminuting the film waste material into recycling material,
- a feeding device for feeding the recycling material, and
- a multi-shaft screw machine for plasticizing the recycling material into a material melt and for processing the material melt into raw material,
- wherein the feeding device comprises a feed screw machine, the feed screw machine has a free cross-sectional area Ai and the multi-shaft screw machine has a free cross-sectional area $A_2$, and wherein $A_1 > A_2$.

* * * * *

UNITED STATES PATENT AND TRADEMARK OFFICE
CERTIFICATE OF CORRECTION

| | |
|---|---|
| PATENT NO. | : 11,986,977 B2 |
| APPLICATION NO. | : 17/481762 |
| DATED | : May 21, 2024 |
| INVENTOR(S) | : Marina Matta et al. |

Page 1 of 1

It is certified that error appears in the above-identified patent and that said Letters Patent is hereby corrected as shown below:

In the Claims

In Column 12, Line(s) 19, Claim 18, delete "Ai" and insert --$A_1$--.

Signed and Sealed this
Fourteenth Day of January, 2025

Derrick Brent
*Acting Director of the United States Patent and Trademark Office*